Inventor
Richard B. Schulz
By Synnestvedt & Lechner
Attorney

INVENTOR
Richard B. Schulz
BY Synnestvedt & Lechner
ATTORNEYS 2,904,762
Patented Sept. 15, 1959

2,904,762

SHIELDED TRANSFORMER

Richard B. Schulz, Philadelphia, Pa.

Application May 20, 1954, Serial No. 431,037
5 Claims. (Cl. 336—84)

This invention relates to transformers and in particular, to shielded transformers for use in broad-band interference suppression.

In commercial devices such as shielded rooms or enclosures, it is ordinarily necessary to conduct functional power into the enclosure. The means for conducting such power must provide against the transfer of interference energy present in the power lines into the room or alternatively prevent the transfer of interference energy generated by equipment within the room from reaching the power lines. For this purpose, so-called power line filters are connected in the lines. These filters are generally of the double Π type, which are enclosed within a metallic box which acts as a shield.

The use of such a filter has several disadvantages. For example, the filter, under certain circumstances, may be rendered partially ineffective. Ordinarily, the line-to-line capacitors in the filter are center-tapped and connected to the box, which is connected to the shielded enclosure which, in turn, is connected to ground. If one of the incoming power lines is also grounded, the filter may be short-circuited and hence, be wholly or partially inoperative.

Further, such filters are conducive to shock hazards. Usually equipment being tested within an enclosure is left ungrounded so that the same conditions under which the equipment is normally used are simulated during testing. Where such equipment has a capacitive connection between the supply leads and its casing, a person touching the casing and any grounded element would be exposed to the voltage appearing across one of the line-to-line capacitors in the power line filter. Furthermore, where equipment being tested incorporates filters having capacitors connected to the casing of the machine, there is a similar shock hazard as mentioned above.

Another disadvantage of power line filters is that a single filter rejects interference only over a limited frequency range. Therefore, if a very broad spectrum is to be covered, a plurality of filters connected in cascade is required.

The present invention contemplates means to conduct power into a shielded enclosure which overcomes the disadvantage mentioned above. This takes the form of a shielded transformer which will not only serve to transfer functional power but, in addition, will prevent the transfer of interference energy present in or out of the enclosure by effectively dissipating the same.

The transformer has a magnetic core on which are arranged primary and secondary windings for transferring functional power, the windings being disposed concentrically or side-by-side, and may be of the unitary, split or multiple type. With any one of the foregoing windings, a metallic shield is arranged to physically and electrically separate the primary windings from the secondary windings (or vice versa) but providing the windings to be magnetically interlinked at low frequency through the medium of a portion or portions of the core.

The shield acts to dissipate interference energy over a broad frequency spectrum.

One advantage of the invention is that the frequency range is greatly extended, i.e., a single transformer gives good attenuation over a frequency band which is much greater than that possible with a single power line filter.

Another advantage is that the cost for broad-band protection is much less since an installation requires only a single shielded transformer rather than a plurality of cascaded filters.

Another advantage is that the power lines are effectively isolated from the enclosure.

Another advantage of the invention is that a more effective grounding system is obtained which results in all parts of the shielded transformer performing their respective functions and further eliminates the shock hazard present in ordinary power line filter.

Before proceeding, it is pointed out that the term "functional power" will be understood to include that which is used to energize equipment within the enclosure, for example, 60 cycle commercial power or audio power where communication is to be held between persons in and outside of the enclosure. Further, while the invention has particular utility in connection with shielded enclosures, it will be understood that the invention may be used with many other types of electronic equipment, for example, as a power transformer for a signal generator or the like.

The manner in which the transformers of the invention are constructed will be apparent from the following description and drawings wherein.

Figures 1, 2, 3, 4, 5:
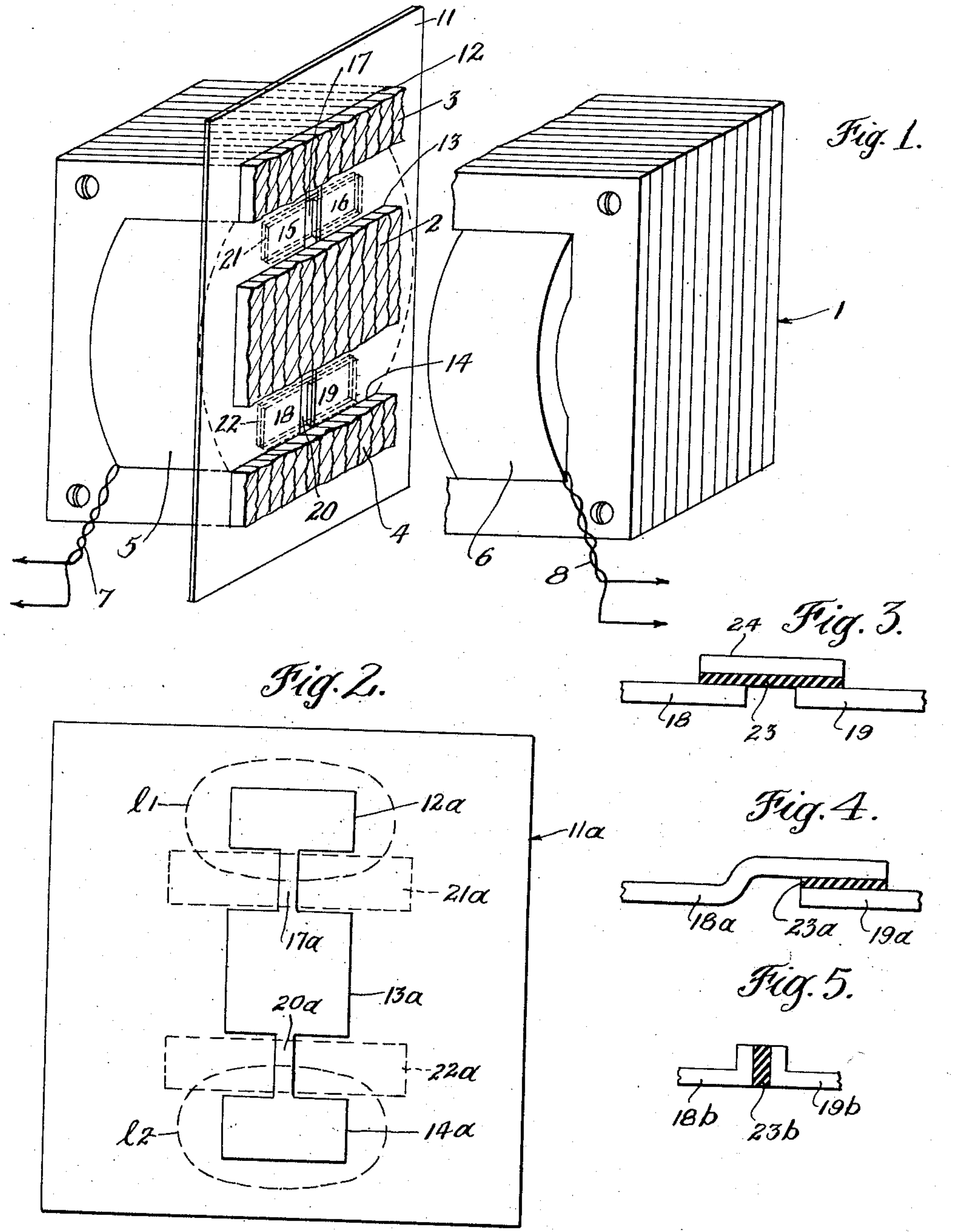
Figure 1 is an isometric view partially exploded and illustrating a shield disposed around a transformer core and physically separating the tarnsformer windings.
Figure 2 is a plan view of a shield similar to the shield shown in Figure 1.
Figures 6, 7:
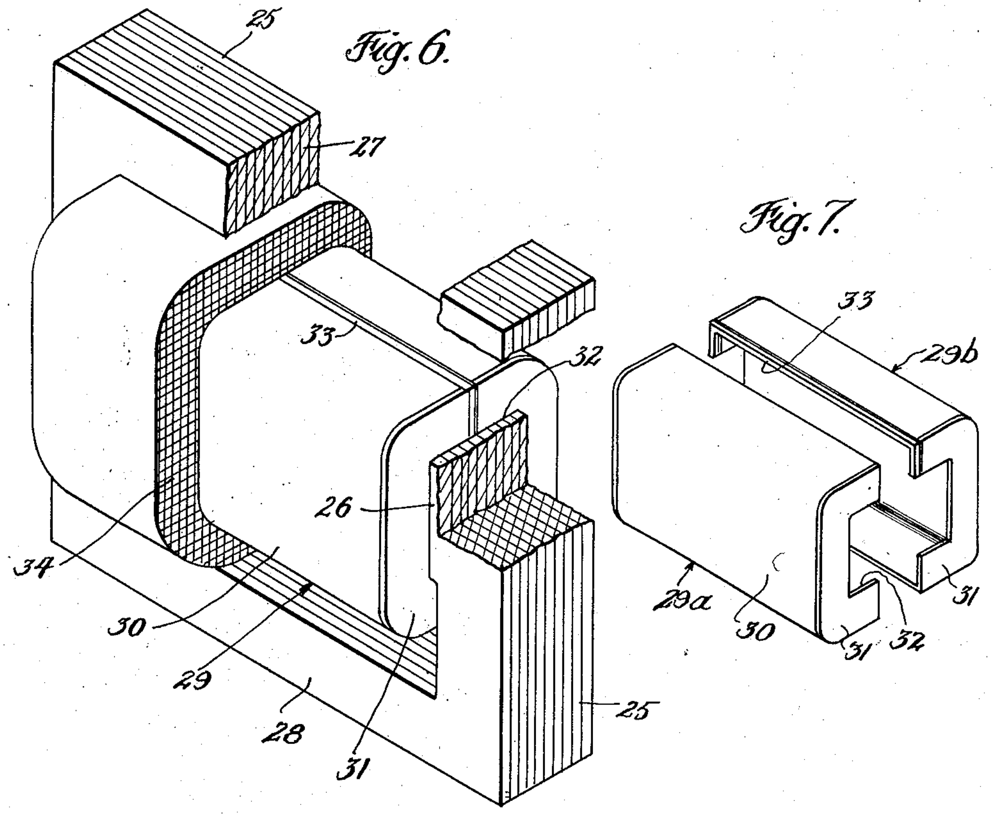
Figure 8:
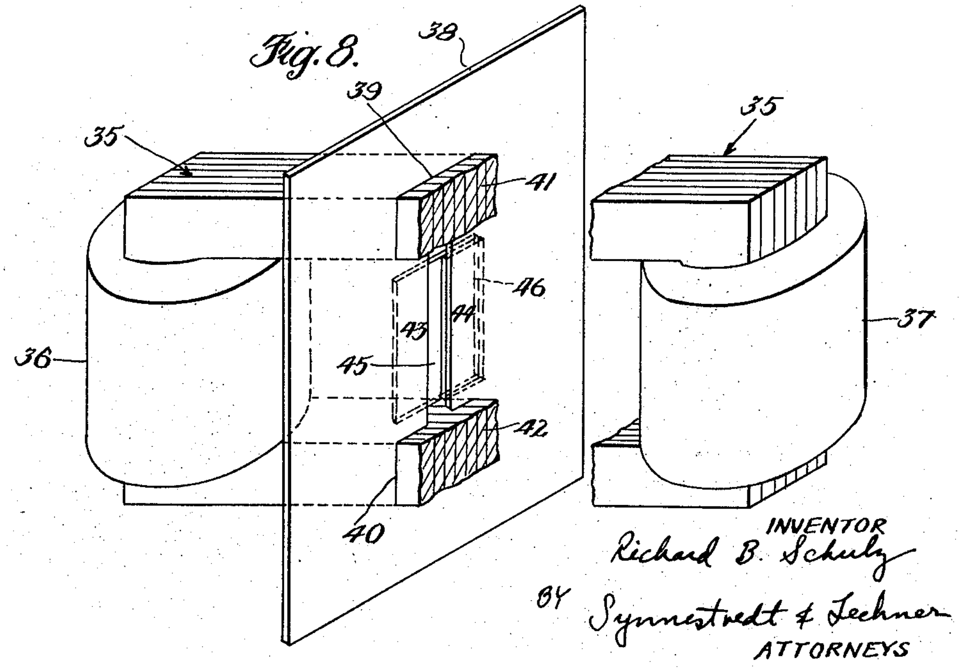

Figures 3, 4 and 5 respectively show different methods for forming capacitive couplings between certain portions of a shield;

Figure 6 is an isometric view of a transformer partially exploded having a can-type shield enclosing the inner winding and serving to physically separate the enclosed winding from the outer winding;

Figure 7 is an isometric view of a shield desirably used with a transformer such as the one shown in Figure 6; and Figure 8 is an isometric view of a transformer partially exploded showing a shield disposed around the transformer core and physically separating the transformer windings.

In Figure 1 the transformer has a core generally indicated by the numeral 1. The core is the well-known E-type and has a center leg 2 and outer legs 3 and 4. A coil or winding 5 and a coil or winding 6 are disposed around the center leg in side-by-side relationship. For purposes of illustration, the winding 5 may be considered the primary and the winding 6 the secondary. Disposed around the core is a substantially flat sheet 11 (preferably solid) of conducting material such as copper, which physically separates the two coils from one another and serves as an electrostatic and an electromagnetic shield.

The shield is positioned over the core between the windings by means of apertures 12, 13 and 14, which respectively accommodate or are pierced by the legs 3, 2 and 4, which serve to magnetically interlink the two coils. The portions 15 and 16 of the shield between the center leg 2 and the outer leg 3 are separated from one another as indicated at 17. The portions 18 and 19 of the shield between the center leg 2 and the outer leg 4 are separated from one another as indicated at 20. The spaces or slits 17 and 20 are respectively bridged by capacitive connections generally indicated by 21 and 22. Ordinarily, the shield is soldered to the core around the periphery of the three apertures and more particularly across the outer edges of the legs 3 and 4.

These capacitive connections are made such as indicated in Figures 3, 4 and 5. For example, in Figure 3 a strip of insulation 23 is bonded to portions 18 and 19 and a piece of conducting material 24, such as copper, is bonded to the insulation. In Figure 4 the portions **18*a* and 19*a* are lapped and insulated from one another by insulation strip 23*a*. In Figure 5 portions 18*b* and 19*b* have right angle ends which are separated by insulation strip 23*b***.

Figure 2 shows a shield similar to that mentioned in connection with Figure 1. The shield **11*a* has apertures 13*a*, 12*a* and 14*a*, which respectively accommodate the center and the outer legs of an E-type transformer. The shield is split as indicated at 17*a* and 20*a*, the spaces being bridged by capacitive connections 21*a* and 22*a***.

The manner in which the shield described above operates to attenuate interference energy is explained following. Assume that energy is conducted through the primary leads 7 to the coil 5. Both the leads and the coil may act as an antenna and radiate this energy. Some of this energy will be radiated through the air in a direction toward the secondary winding and hence, will impinge upon the shield and be dissipated in the form of heat due to the eddy currents and resistance of the shield material. That interference energy which follows the "regular" flux path through the air will be similarly dissipated. Some of the energy will be dissipated in the core also due to setting up of eddy currents.

While I have shown the shield 11 to be slightly larger than the cross section of the transformer 1, it will be understood that the length and width of the shield may be of dimensions effective to perform its intended function or be connected to a conducting structure which effectively encloses one or the other of the windings. Where the transformer is used with a shielded enclosure or room, it is intended that the shield be soldered to one wall of the shielded room such that the secondary winding is enclosed therein.

One purpose of splitting the shield, as indicated at 17 and 20 on Figure 1 and **17*a* and 20*a*** on Figure 2, is to prevent, at low frequencies, the flow of eddy currents around the loops indicated by the dotted lines $l_1$ and $l_2$. Without the splitting, these loops might act as short-circuited turns, which would effectively become parasitic windings and substantially impair the efficiency of the transformer at functional frequencies. The purpose of the capacitive connection across these split portions is done deliberately to make the loops act as short-circuited turns insofar as high frequencies are concerned. Thus, the arrangement is conductive to dissipation of the high frequency energy but not the low or functional frequency.

Of course, the actual value of capacitance used depends upon the functional frequency of the transformer and may be calculated by methods well-known to those skilled in the art such that the reactance is very high at low frequencies and very small at high frequencies.

If desired, the solder bead on the outer edges of the legs 3 and 4 may be discontinuous between selected laminations such that the laminations do not act as part of a short-circuited turn at low frequencies. However, I have found that this is not required in all cases because any current which flows is of a value as not to undesirably impair the transformer efficiency.

In Figure 6 I have shown another embodiment of the invention where a can-like shield separates two windings arranged concentrically on an E-type core. The core 25 has a center leg 26 and two outer legs 27 and 28. A coil or winding (not shown) is wound around the center leg. A can-like shield 29 surrounds the winding. The shield has a side member 30 and two identical end members, one of which is indicated at 31. Both of the side members have apertures for accommodating the center leg 26, the aperture in the end member 31 being indicated at 32.

As is seen in Figure 7, the can may be constructed of two half portions **29*a* and 29*b*. In order to prevent the side member 30 and the end members 31 from acting as short-circuited turns to low frequency currents, the can is provided with a strip of insulation 33**, which extends from one aperture to the other. The two halves of the can may be soldered together except over the insulation strip, which may be provided with bonding material for fastening purposes. The shield may be soldered to the core by making a bead around most of the periphery of the two apertures.

As will be apparent from an inspection of Figure 6, another coil 34 is wound around the can 29. Either coil may serve as a primary, although it is preferred that the coil within the can be used for this purpose. It will be noted that the coils are magnetically interlinked via the center leg 26.

Any interference energy radiating or emanating from the coil within the can will be dissipated thereby. While the primary coil is completely surrounded, this will not greatly impair the efficiency of the transformer because the flux due to functional currents will travel the usual paths through the legs of the core.

Where the transformer is used with a shielded enclosure, either end member 31 may be soldered to one wall or the coil wires may run through a metallic tubing shield which is connected to the enclosure.

In Figure 8 I have shown another embodiment of the invention where a transformer has an O-type core 35 about which are wound coils or windings 36 and 37. A shield 38 is disposed around the core, the shield having apertures 39 and 40, which accommodate or are pierced by the legs 41 and 42 of the core. The portions 43 and 44 between the two legs are separated as indicated at 45, and have a capacitive connection 46.

In any of the embodiments described, the primary and secondary windings, where desirable, may be shunted with capacitors. I have found such an arrangement is conducive to improving both the low and the high frequency response. For example, a line-to-line capacitor may be used for low frequency and line-to-line capacitors center-tapped to ground may be used for high frequency. The particular values of such capacitors may be selected or determined by known methods.

While I have described the invention in connection with single phase transformers, it will be understood that the invention may readily be applied to polyphase transformers. Furthermore, it will be understood that the invention may be applied to audio transformers having split windings for reducing leakage inductance, or to power transformers having multiple windings.

Although the invention has been described in connection with the use of a single sheet of shielding material, it will be understood that multiple sheets are contemplated. For example, the configuration of Figure 1 may be provided with two shields so that one may be soldered to the outside of a wall of an enclosure and the other to the inside of a wall of an enclosure. Furthermore, shields having different thickness may be used. For example, I have obtained good results with shields in the order of 0.008 to 0.032 inch thick. In addition, I have successfully used clad shields, that is, a shield comprising a laminate of copper and steel.

A typical example of the performance of the invention will be apparent from the following. An arrangement as shown in Figure 1 was connected to the walls of a shielded enclosure and tests at various frequencies were made in the usual manner. The rating of the transformer was 4.6 kva., and the shield was solid copper having a thickness of 0.032″. By-pass capacitors were connected on the primary and secondary sides. The following results were obtained:

| Frequency: | Insertion loss, db |
|---|---|
| 0.015 mc. | 58 |
| 0.1 mc. | 102 |
| 1.0 mc. | 123 |
| 10.0 mc. | 109 |
| 400.0 mc. | 102 |
| 1800.0 mc. | 92 |

I claim:

1. A transformer comprising: a core constructed of laminations and arranged to provide flux loops, the core having a plurality of elongated members forming portions of said loops; a primary and a secondary winding arranged on said core; shielding means physically separating one winding from the other including a section formed with a plurality of apertures through which the elongated members respectively pass, said section being formed so that between adjacent apertures there extends a slit; and a solder bead electrically connecting laminations of said core to said shield.

2. A construction in accordance with claim 1 and further including, for each slit, a capacitive connection including a strip of insulation extending across the slit and a strip of conducting material bonded to the insulation whereby to be spaced from said portion.

3. A construction in accordance with claim 1 wherein said solder bead interconnects substantially all of the laminations of said core to said shield.

4. A construction in accordance with claim 1 wherein said core is an E type and has three elongated members forming respectively a center leg and two outer legs; the primary and secondary windings are arranged in side-by-side relationship on the center leg; the shielding means has three apertures, an inner aperture for the center leg and two outer apertures respectively for the outer legs; and there are two of said slits, one slit extending between the center aperture and one outer aperture and the other slit extending between the center aperture and the other outer aperture.

5. A construction in accordance with claim 1 wherein said core is of the O type, there are two elongated members each being part of opposite sides of the O, and the shielding means being formed with two apertures, one for each member, and the slit extending therebetween.

References Cited in the file of this patent

UNITED STATES PATENTS

| | | |
|---|---|---|
| 2,114,189 | Kronmiller | Apr. 12, 1938 |
| 2,170,048 | Dunning et al. | Aug. 22, 1939 |
| 2,183,355 | Mauerer | Dec. 12, 1939 |

FOREIGN PATENTS

| | | |
|---|---|---|
| 186,403 | Switzerland | May 1, 1937 |